Patented Apr. 3, 1945

2,372,960

UNITED STATES PATENT OFFICE 2,372,960

CYANINE DYESTUFF INTERMEDIATES

John David Kendall, Henry Walter Wood, and John Raymond Majer, Ilford, England, assignors to Ilford Limited, Ilford, Essex, England, a British company No Drawing. Application October 8, 1942, Serial No. 461,322. In Great Britain November 6, 1941

11 Claims. (Cl. 260—240)

This invention relates to the production of new organic compounds which are of value as intermediates in the manufacture of dyestuffs.

Processes are already known for the manufacture of organic compounds of the general Formula I:

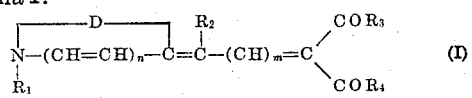

where D is the residue of a heterocyclic nitrogen nucleus, $R_1$ is an alkyl or aralkyl group, $R_2$ is a hydrogen atom or an alkyl or aralkyl group, $R_3$ and $R_4$ are hydrocarbon groups, e. g. alkyl, aryl or aralkyl groups, $n$ is nought or 1 and $m$ is 1, 3 or 5. Thus compounds of the general Formula I where $m$ is 1 may be prepared by reacting an alkyl or aralkyl quaternary salt of a heterocyclic nitrogen compound containing an ω-acetanilidovinyl group in the α or γ position to the heterocyclic nitrogen atom with a 1.3-diketone of the formula $$R_3.CO.CH_2.CO.R_4 \quad (II)$$

or by reacting an alkyl or aralkyl quaternary salt of a heterocyclic nitrogen compound containing a methyl or mono-substituted methyl group in the α or γ position to the heterocyclic nitrogen atom with an ethoxy-methylene derivative of a 1.3-diketone of the general formula:

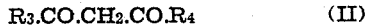

Compounds in which $m$ is 2 or 3 may be prepared by analogous methods.

Processes have also been described for converting compounds of the type of

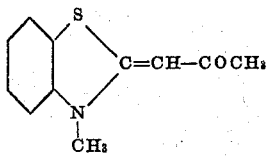

to the corresponding thio compounds of the type

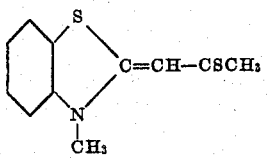

These processes consist in directly heating the former compound with phosphorus pentasulphide or treating the former compound with phosphorus pentachloride and then with thioacetamide. It has been found that neither of these processes is effective in converting compounds of general formula I to the corresponding thione compounds.

It has now been discovered, however, and this forms the basis of the present invention, that compounds of general Formula I may be readily converted to corresponding compounds containing reactive thioether groups by treating with an alkyl- or aralkyl-mercaptan in the presence of a strong acid or an alkyl salt of a strong acid. The reaction may be effected in the presence of a solvent for the reactants; however, if a hydroxylic solvent is employed there results some hydrolysis of the compounds of general Formula I to the corresponding mono-acylated compounds. In order to reduce as much as possible this tendency to hydrolysis, the reagents are preferably used as dry as possible. A very convenient acid to use is dry hydrochloric acid gas. Any excess of this remaining at the end of the reaction is capable of removal under reduced pressure.

The course of the reaction is believed to be as follows: (In these formulae A is an acid radicle, $R_5$ is an alkyl or aralkyl group and the other symbols have the meanings assigned to them above).

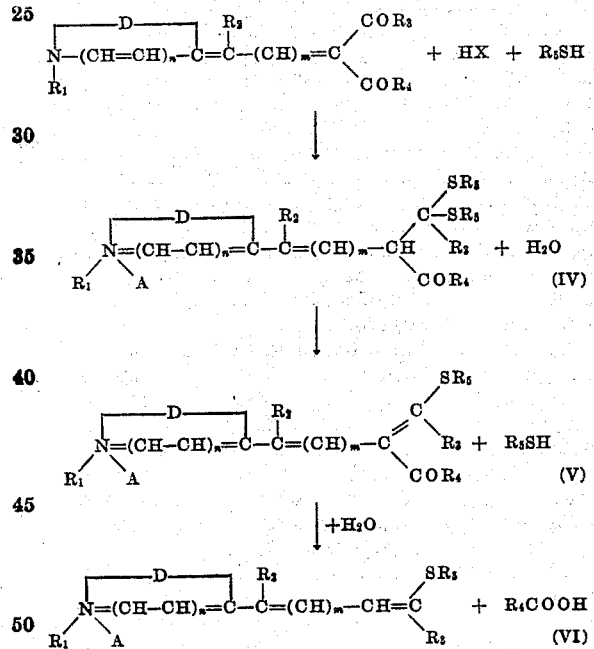

The applicants' new intermediates are believed to have general Formula VI. It is clear that the reaction does not depend on an initial hydrolysis of the compound of general Formula I to the mono-acylated compound from the fact that treatment of the mono-acylated compound with an alkyl mercaptan and an acid does not produce the thio compound, the original material being obtained unchanged.

The new intermediates of general Formula VI may readily be isolated from any acylated products produced by hydrolysis of the compounds of general Formula I since the new intermediates are more soluble in ethyl and methyl alcohol. The new intermediates are quite stable in such alcoholic solution and evaporation of the alcohol under reduced pressure yields the intermediates in solid form.

Referring to the formulae set forth above, the residue D may be the residue of any heterocyclic nitrogen compound, e. g. the residue of any of the heterocyclic nitrogen compounds commonly employed in the manufacture of cyanine dyestuffs such as the substituted and unsubstituted thiazoles, thiazolines, oxazoles, oxazolines, selenazoles, selenazolines, pyridine, quinoline, indolenine, diazines (e. g. pyrimidine) thio-diazoles and quinazoline and the corresponding substituted or unsubstituted polycyclic compounds such as benzthiazoles, naphthathiazoles and anthrathiazoles and also the diazines described in Specification No. 425,609.

The groups $R_1$, $R_2$, $R_3$, $R_4$ and $R_5$ may variously be hydrogen atoms, alkyl groups, aryl groups and aralkyl groups as above defined. $R_1$ is preferably a lower alkyl group, i. e. a methyl, ethyl, propyl, or butyl group or, if an aralkyl group, is preferably a benzyl group. The group $R_2$ may be a hydrogen atom, but if not, is preferably a lower alkyl group as defined above. It may, however, be a higher alkyl group or an aralkyl group such as benzyl. $R_3$ and $R_4$ are preferably lower alkyl groups though they may be higher alkyl groups or aralkyl groups as in the case of the group $R_2$ or they may be aryl groups. The group $R_5$ is preferably a lower alkyl group since the lower alkyl mercaptans are more easily reactive in the process of this invention, though it may be a higher alkyl group or an aralkyl group, as in the case of the group $R_2$. Any of the aforesaid alkyl, aryl or aralkyl groups may themselves contain substituent groups, e. g. hydroxy or amino groups.

As indicated above, dry hydrochloric acid gas is a very convenient acid to employ in the process of this invention. However, other strong acids may be employed, e. g. other hydrohalic acids, nitric acid, sulphuric acid, or phosphoric acid, or strong organic acids, e. g. p-toluene-sulphonic acid, or alkyl salts of such acids, e. g. alkyl halides such as methyl iodide.

The intermediates obtained by the process of the present invention are in the form of quaternary salts and it is to be understood that they may be converted to quaternary salts of other acids by treatment with suitable salts of such other acids, e. g. alkali metal salts. Thus intermediates obtained as chlorides may be converted to bromides or iodides by treatment with potassium bromide or potassium iodide.

The following examples illustrate the invention:

*Example 1*

Preparation of the dyestuff intermediate of the probable formula:

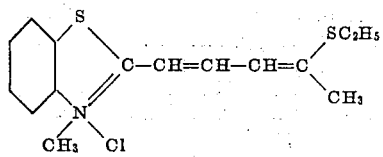

7.5 gms. of 1-(ω-diacetyl-propenylidene)-2-methyl-dihydrobenzthiazole, 30 ccs. of methyl alcohol and 10 ccs. of ethyl mercaptan were mixed together and cooled. Dry hydrochloric acid gas was passed through the mixture for 2½ hours and the mixture was then allowed to stand for 24 hours. On evaporating the clear solution in a vacuum desiccator, the product was obtained as a slightly sticky brown solid.

The corresponding N-ethyl derivative may be similarly prepared and is also a sticky brown solid.

*Example 2*

Preparation of the dyestuff intermediate of the probable formula:

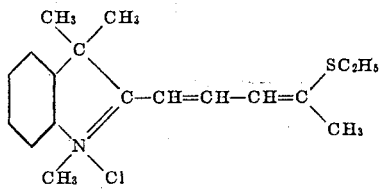

10.5 gms. of 2-(ω-diacetyl-propenylidene)-1.3.3-trimethyl indolenine was dissolved in 250 ccs. of benzene and 15 ccs. of ethyl mercaptan was added to the cold solution. A current of dry hydrochloric acid gas was passed through the solution until the solution was saturated. A precipitate resulted which changed to an oil after standing overnight. This was separated and dried in a vacuum desiccator until it crystallised out. It was purified by refluxing it with 100 ccs. of dry ethyl acetate, the product separating on cooling as a pasty mass which solidified to a purple solid.

An alternative method of preparing this dye consists in mixing 15 gms. of the said indolenine compound with 50 ccs. of ethyl mercaptan, passing 4 gms. of dry hydrochloric acid gas through the mixture, allowing the mixture to stand and then evaporating off the excess mercaptan, leaving the desired dyestuff intermediate.

*Example 3*

Preparation of the dyestuff intermediate of the probable formula:

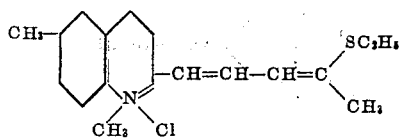

6.5 gms. of 1,6-dimethyl-2-(ω-diacetyl-propenylidene)-1.2-dihydroquinoline, 30 ccs. of methyl alcohol and 10 ccs. of ethyl mercaptan were mixed together and dry hydrochloric acid gas was passed through the mixture until the suspended solid went into solution. The process was continued until an orange solid began to precipitate and the solution turned orange. This precipitate was removed by filtration and consisted of 1,6-dimethyl-2-(ω-acetyl-propenylidene)-1.2'-dihydroquinoline. The filtrate was then evaporated to dryness under reduced pressure and yielded the desired dyestuff intermediate as a reddish brown solid melting at 74° C.

Example 4

Preparation of the dyestuff intermediate of the probable formula:

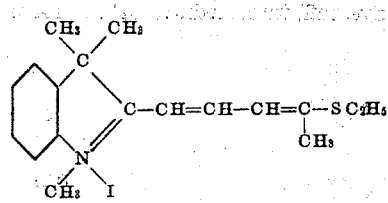

11 gms. of 2-(ω-diacetyl-propenylidene)-1.3.3-trimethyl indolenine, 18 ccs. of ethyl mercaptan and 5 ccs. of methyl iodide were dissolved in 100 ccs. of dry benzene and left to stand for 14 days. A brown oil separated. The supernatent benzene was decanted off and the oil was dried in a vacuum desiccator. On standing for some time it solidified to a light brown solid. This was recrystallised from methyl alcohol yielding the dyestuff intermediate as tiny light red needles melting at 120° C. This dyestuff intermediate is obtained in the form of the iodide salt and otherwise corresponds to the product of Example 2. The iodide salts of others of the compounds described in the foregoing examples may be similarly prepared. Thus the iodide salt of the compound of Example 1 consists of shining blue-black needles melting at 209° C.

Example 5

Preparation of the dyestuff intermediate of the probable formula:

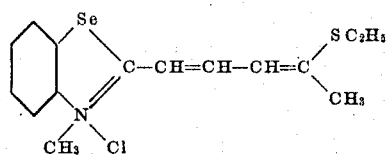

9 gms. of 1-(ω-diacetyl-propenylidene)-2-methyl-dihydro benzselenazole and 50 ccs. ethyl mercaptan were mixed together, and 3 gms. dry HCl gas was passed through the mixture. The solid dissolved and the mixture was allowed to stand for three days. Excess mercaptan was then removed, leaving the desired dyestuff intermediate as a light brown sticky solid.

Example 6

Preparation of the dyestuff intermediate of the probable formula:

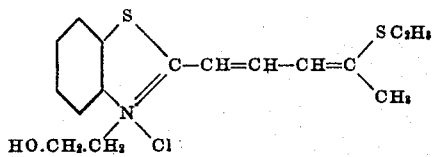

6 gms. of 1-(ω-diacetyl-propenylidene)-2-β-hydroxy-ethyl-dihydro-benzthiazole and 50 ccs. of ethyl mercaptan were mixed together and cooled, 1.5 gms. of dry hydrochloric acid gas was passed through the mixture and the mixture was then allowed to stand for 3 days. The excess mercaptan was then distilled off leaving the desired dyestuff intermediate (after drying in a vacuum desiccator) as a sticky orange-brown solid.

Example 7

Preparation of the dyestuff intermediate of the probable formula:

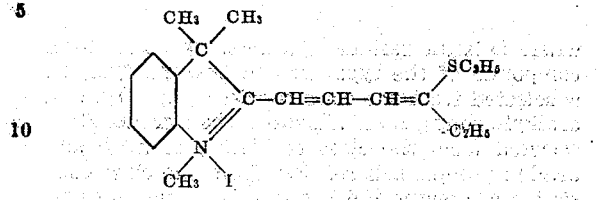

17.8 gms. of 2-(ω-dipropionyl-propenylidene)-1.3.3-trimethyl indolenine were mixed with 100 ccs. of ethyl mercaptan and 8 gms. of methyl iodide was added. The mixture was allowed to stand for a week during which a red oily layer separated. This was removed and the excess mercaptan distilled off, yielding the desired dyestuff intermediate as a red solid.

What we claim is:

1. A process for the production of dyestuff intermediates which comprises reacting a compound of the general formula:

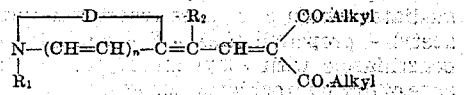

where D is the residue of a heterocyclic nitrogen compound of the type used in cyanine dyes, $R_1$ is selected from the class consisting of alkyl and aralykyl groups, $R_2$ is selected from the class consisting of hydrogen atoms and alkyl and aralkyl groups, and $n$ is selected from the class consisting of nought and 1 with a substance selected from the class consisting of alkyl and aralkyl mercaptans in the presence of a substance selected from the class consisting of strong mineral acids and alkyl salts thereof.

2. A process for the production of dyestuff intermediates which comprises reacting a compound of the general formula:

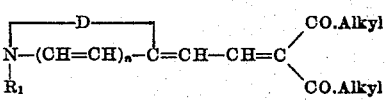

where D is the residue of a heterocyclic nitrogen compound of the type used in cyanine dyes, $R_1$ is selected from the class consisting of alkyl and aralkyl groups, and $n$ is selected from the class consisting of nought and 1 with a lower alkyl mercaptan in the substantial absence of any hydroxylic substance and in the presence of a substance selected from the class consisting of strong mineral acids and alkyl salts thereof.

3. A process for the production of dyestuff intermediates which comprises reacting a compound of the general formula:

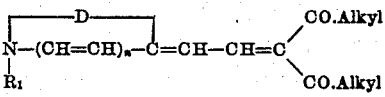

where D is the residue of a heterocyclic nitrogen compound of the type used in cyanine dyes, $R_1$ is selected from the class consisting of alkyl and aralkyl groups, and $n$ is selected from the class consisting of nought and 1 with a lower alkyl mercaptan, in the substantial absence of any hydroxylic substance and in the presence of dry hydrochloric acid gas.

4. A dyestuff intermediate of the general formula:

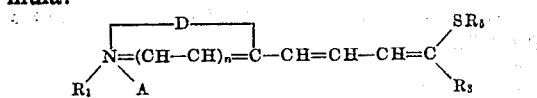

where D is the residue of a heterocyclic nitrogen compound of the type used in cyanine dyes, $R_1$ is selected from the class consisting of alkyl and aralkyl groups, $R_3$ is a hydrocarbon group, $R_5$ is selected from the class consisting of alkyl and aralkyl groups, $n$ is selected from the class consisting of nought and 1, and A is an acid residue.

5. A dyestuff intermediate of the general formula:

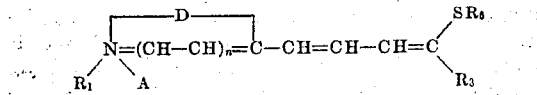

where D is the residue of a heterocyclic nitrogen compound of the type used in cyanine dyes, $R_1$ is selected from the class consisting of alkyl and aralkyl groups, $R_3$ and $R_5$ are each alkyl groups, $n$ is selected from the class consisting of nought and 1, and A is an acid residue.

6. A process for the production of dye intermediates which comprises reacting 1-(omega diacetyl - propenylidine) - 2 - methyl - dihydro benzthiazole with ethyl mercaptan in the presence of dry hydrochloric acid gas.

7. A dyestuff intermediate of the formula:

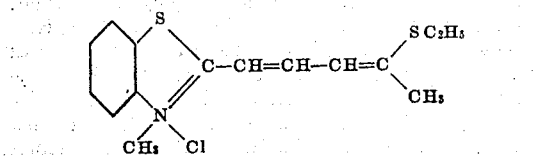

8. A process for the production of dyestuff intermediates which comprises reacting 2-(omega diacetyl - propenylidine) - 1.3.3 - trimethylindolenine with ethyl mercaptan in the presence of dry hydrochloric acid gas.

9. A dyestuff intermediate of the formula:

10. A process for the production of dyestuff intermediates which comprises reacting 1-(omega-diacetyl - propenylidine) - 2 - methyl - dihydro benzselenazole with ethyl mercaptan in the presence of dry hydrochloric acid gas.

11. A dyestuff intermediate of the formula:

JOHN DAVID KENDALL.
HENRY WALTER WOOD.
JOHN RAYMOND MAJER.

CERTIFICATE OF CORRECTION.

Patent No. 2,372,960. April 3, 1945.

JOHN DAVID KENDALL, ET AL.

It is hereby certified that error appears in the printed specification of the above numbered patent requiring correction as follows: Page 4, second column, line 11, claim 9, for that portion of the formula reading "$SC_2H_4$" read --$SC_2H_5$--; and that the said Letters Patent should be read with this correction therein that the same may conform to the record of the case in the Patent Office.

Signed and sealed this 11th day of September, A. D. 1945.

Leslie Frazer (Seal)                First Assistant Commissioner of Patents.